Patented Dec. 6, 1932

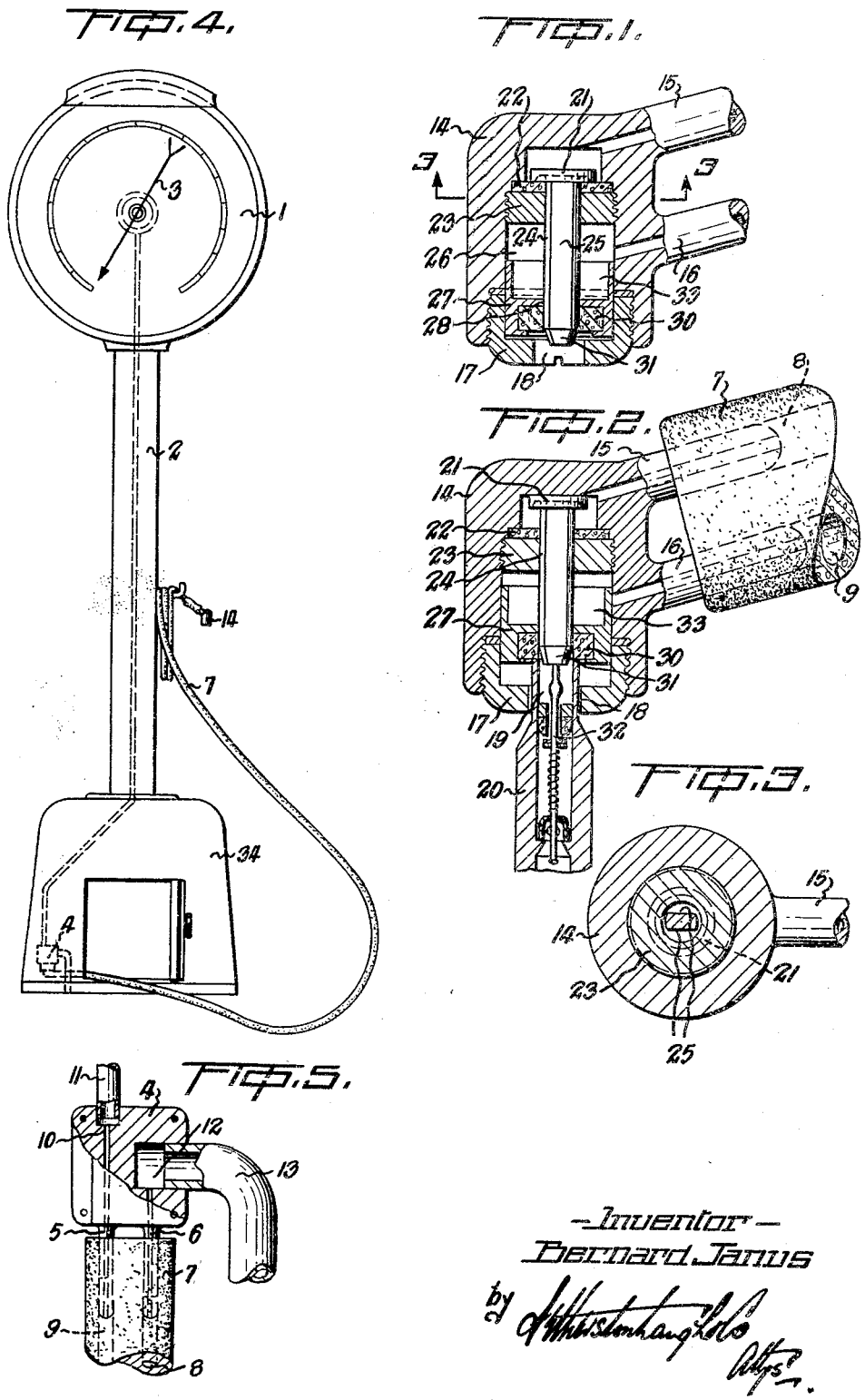

1,890,036

UNITED STATES PATENT OFFICE

BERNARD JANUS, OF SARNIA, ONTARIO, CANADA, ASSIGNOR TO SARNIA AIR EQUIPMENT LIMITED, OF SARNIA, ONTARIO, CANADA, A CORPORATION OF CANADA

GAUGE FOR TIRE INFLATION AIR LINES AND THE LIKE

Application filed September 14, 1931. Serial No. 562,803.

My invention relates to improvements in gauges for tire inflation air lines and the like, and my invention is particularly designed for use in conjunction with an air line extending from the pressure tank and a built in gauge for indicating the tire air pressures.

The object of my present invention is to provide a particular design of chuck upon the end of the air line for making connection with and opening the tire valve, and also to furnish a double conduit air line, the conduits of which extend to the gauge and tank respectively, and another and particular object of my invention is to so design the chuck that when the air passage from the tire valve to the gauge through the chuck is open the air passage through the chuck to the pressure tank is closed and vice versa.

Another object of my invention is to construct the chuck of a minimum number of parts in which there will be little possibility of the chuck going out of order or the chuck rendered inoperable through leakage of the air passage therein.

My invention consists of a gauge for tire inflation air lines and the like constructed and arranged all as hereinafter more particularly described and illustrated in the accompanying drawing in which:—

Fig. 1 is a vertical cross sectional view through my chuck removed from the air line, and showing it magnified in size.

Fig. 2 is a similar view to Figure 1, showing the chuck upon the end of the air line, and also positioned upon a tire valve which is shown in cross section.

Fig. 3 is a horizontal cross sectional view of the chuck taken through the line 3—3, Figure 1.

Fig. 4 is a front elevational view of a gauge of the type used in conjunction with my chuck, and Fig. 5 is a front elevational view partly in section of the union member contained within the gauge structure and to which the inner end of the air line is connected.

Like characters of reference indicate corresponding parts in the different views in the drawing:—

The air gauge used in conjunction with my invention can be of any suitable type such as that illustrated in the drawing, wherein a dial 1 is supported upon the upper end of a standard 2 and a rotatable air pressure indicating hand 3 mounted centrally of the dial, such hand being actuated by any suitable metering mechanism.

The lower end of the standard 2 is supported upon a base 34 which contains a union member 4. The union member 4 has a pair of bored nipple members 5 and 6 extending therefrom, such nipple members being adapted for insertion into the end of a flexible pipe line 7 having a pair of conduits 8 and 9 therein into which the nipples respectively extend. The nipple 5 communicates with a bore 10 extending through the union member which in turn communicates with a pipe 11 extending upwardly to the metering mechanism actuating the indicating hand 3. The other nipple 6 communicates with a bore 12 in the union which in turn communicates with a pipe 13 extending to the air pressure tank which is not shown.

The air pressure tank will of course follow standard practice in design and have the air pressure maintained therein by means of a power actuated air pump.

The air chuck assembly is contained within a casing 14 formed with a pair of bored nipples 15 and 16 protruding therefrom and inserted into the conduits 8 and 9 in the outer end of the air line. The casing 14 is of cupped form and interiorly threaded at its open end to receive a cap 17 having a central orifice 18 for the reception of the outer end 19 of a tire valve 20. The bore of the nipple 15 communicates with the inner end of the interior of the casing 14, and the bore of the nipple 16 communicates with the inner portion of the casing intermediately of its length.

For closing the chuck against the passage of air therethrough when it is not being used for inflating I provide a mushroom valve 21 which normally rests upon the face of a washer 22 formed of rubber or other suitable material. The washer 22 rests against a shoulder formed interiorly of the casing 14 in the vicinity of its inner end and is retained in place by a ring 23 which is threaded into the interior of the casing. The valve 21 has a stem 24 formed with flats 25 and extending through the washer 22 and ring 23 into the orifice 18 in the cap 17.

It will be readily understood that the air pressure from the pressure tank passing through the conduit 8 in the pipe line and the nipple 15 will bear upon the head of the valve 21 and retain it in its seat until it is manually removed from the seat through pressure upon the end of the stem 24.

The outer end of the casing 14 which is threaded to receive the cap 17 is of increased diameter at such threaded portion in order that the interior diameter of the cup shaped cap can be made the same diameter as, and form a continuation of the bore 26 in the casing. The bore 26 and interior of the cap 17 contain a cylindrical slide valve 27 which is provided to reciprocate and open and close the bore entrance to the nipple 16. The valve 27 is formed with a central orifice 28 through which the valve stem 24 extends and the outer face of the valve is recessed to contain a rubber or similar washer 30 to receive the upper end of a tire valve when it is inserted into the orifice 18.

When my device is in use the chuck is positioned upon a tire valve wherein the end 19 of the valve protrudes into the orifice 18. The outer end 31 of the valve stem which is tapered is of less diameter than the bore of the valve end 19 so that it projects slightly into the valve end 19 and contacts with the tire valve stem 32 to press it down and open the tire valve. Immediately the tire valve is thus opened the air in the tire passes through the valve end 19 along the valve stem 24 through the provision of the flats 25 and into the bore 26, wherein such air pressure will pass through the nipple 16, conduit 9 and pipe 11 to the metering mechanism in the air gauge, wherein the hand 3 will indicate the air pressure of the tire and at the same time such air pressure in the bore 26 will retain the slide valve 27 in its outermost position with its rubber washer 30 in tight engagement with the valve end 19, thus preventing any leakage of air. When the air pressure in the tire has been ascertained and it is desired to raise such pressure the chuck is pushed down upon the valve 20 a further degree wherein the valve end 19 will protrude a further distance into the chuck through the orifice 18 and move the slide valve 27 inwardly wherein its upper skirt 33 will cover the bore entrance to the nipple 16. At the same time the pressure of the tire valve stem 32 against the chuck stem 24 will lift the chuck valve 21 from off its seat upon the washer 22 thus permitting air pressure to pass from the pressure tank through the conduit 8, nipple 15 and along the flats 25 in the valve stem into the tire valve.

If it is desired to ascertain the tire pressure during inflation the chuck is lifted upwardly on the valve a slight degree which will permit the valve to close and the slide valve 27 to return to its outermost position under the withdrawal of the tire valve end 19, wherein the tire air pressure will again re-assert itself in the bore 26 and pass therethrough to the meter in the gauge. If further air injection is required the chuck is merely pressed more firmly upon the valve which closes off communication with the gauge and opens communication with the pressure tank as before described.

From the foregoing description it will be seen that I have devised a particularly simple and yet very efficient means for enabling air pressures to be accurately determined both before and during inflation, and furthermore, in my device the gauge which is necessarily delicate for accuracy is contained within a rigidly built in structure and is not subjected to hard usage as is the case wherein gauges are incorporated in the air chucks, and although I have shown and described a particular embodiment of my invention it is to be understood that I can make such changes and alterations as I may deem necessary from time to time without departing from the spirit of my invention as set forth in the appended claims.

What I claim as my invention is:

1. A tire inflation air line chuck adapted for use in combination with a tire valve of the type incorporating a barrel in which the tire valve stem extends to the vicinity of the open end thereof, comprising a casing, a pair of air conduits communicating with the interior of the casing, a mushroom valve in the casing controlling communication with one of the conduits and having its stem extending to a tire valve barrel receiving orifice in the casing and adapted to contact with the valve stem in the tire valve barrel, a slide valve also contained within the casing and controlling communication with the other conduit and adapted to contact with the end of the tire valve barrel.

2. A tire inflation air line chuck adapted for use in combination with a tire valve of the type incorporating a barrel in which the tire valve stem extends to the vicinity of the open end thereof, comprising a casing, a pair of air conduits communicating with the interior of the casing, a mushroom valve in the casing controlling communication with one of the conduits and having its stem extending to a tire valve barrel receiving orifice in the casing and adapted to contact with the valve stem in the tire valve barrel, a sleeve valve slidably contained within the casing and controlling communication with the other conduit and through which the mushroom tire valve stem freely extends, said sleeve valve being positioned adjacent to the tire valve barrel receiving orifice and adapted to make contact with the tire valve barrel.

3. A tire inflation air line chuck adapted for use in combination with a tire valve of the type incorporating a barrel in which the tire valve stem extends to the vicinity of the open end thereof, comprising a casing having a bore extending inwardly from a tire valve barrel receiving orifice, a pair of air conduits communicating with the bore, a mushroom valve in the inner end of the bore controlling communication with one of the conduits and having its stem extending through the bore to the tire valve receiving orifice, a cup shaped sleeve valve slidable within the bore to control communication with the other conduit and through an air passage orifice of which the valve stem freely extends, the end of the mushroom valve stem being adapted to make contact with and depress the valve stem in the tire valve, and the sleeve valve to contact with and be actuated by the end of the tire valve barrel.

BERNARD JANUS.